United States Patent [19]

Kunz et al.

[11] 3,957,075

[45] May 18, 1976

[54] FLOW-SENSITIVE PRESSURE LIMITING VALVE FOR HYDRAULIC EQUIPMENT

[75] Inventors: Max Kunz, Meyrin; Kurt Christiansen, Oberbuchsiten, both of Switzerland

[73] Assignee: Von Roll AG, Gerlafingen, Switzerland

[22] Filed: Apr. 2, 1975

[21] Appl. No.: 564,339

[30] Foreign Application Priority Data

Apr. 9, 1974    Switzerland.......................... 4943/74

[52] U.S. Cl................................ 137/117; 417/252; 417/300
[51] Int. Cl.²......................................... G05D 7/01
[58] Field of Search ............ 137/115, 117; 417/252, 417/300

[56] References Cited
UNITED STATES PATENTS

| | | | |
|---|---|---|---|
| 3,384,020 | 5/1968 | Searle | 417/300 |
| 3,563,262 | 2/1971 | Wood | 137/117 |
| 3,865,127 | 2/1975 | Lewis | 137/117 X |

*Primary Examiner*—Robert G. Nilson
*Attorney, Agent, or Firm*—William R. Woodward

[57] ABSTRACT

A relief valve for limiting the pressure of the output of a feed pump being furnished to a main hydraulic pump is provided not only with a bore through the valve disk leading to a chamber at the rear of the guide piston for counteracting, as relief valving continues, the force of the spring tending to keep the valve closed, but also a pressure piston, in the form of an annular flange on the guide piston, subdividing an outer cylindrical space into two chambers respectively connected to a constriction in a hydraulic conduit, so that the amount of flow through the constriction will additionally modify the limit pressure at which relief valving takes place. The device is used to reduce the limit pressure when the feed pump provides excessive oil feed to the main pump.

4 Claims, 2 Drawing Figures

U.S. Patent   May 18, 1976   3,957,075
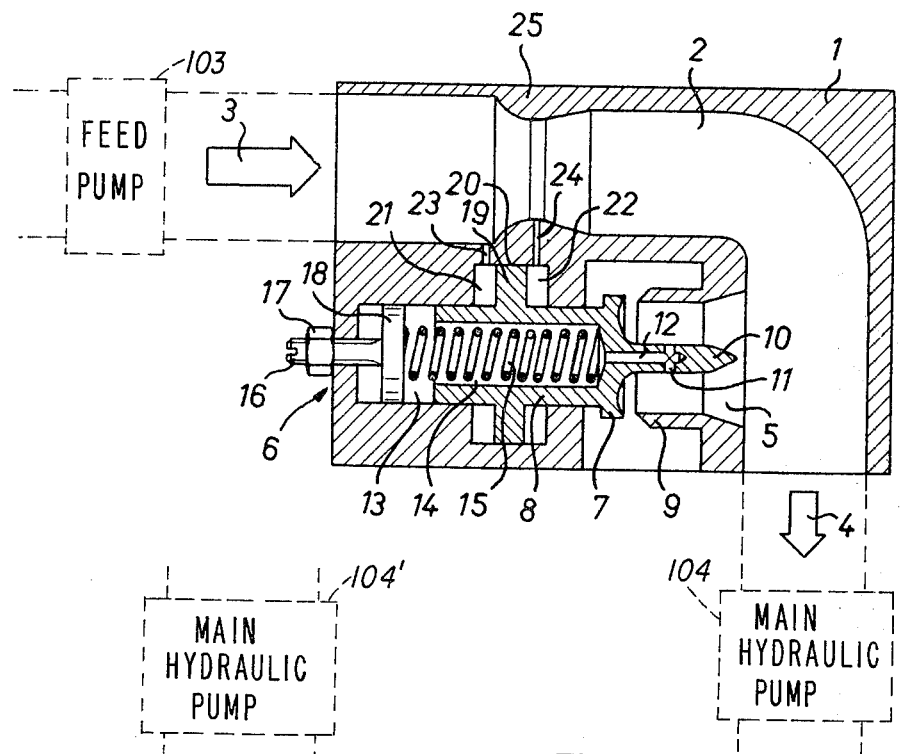
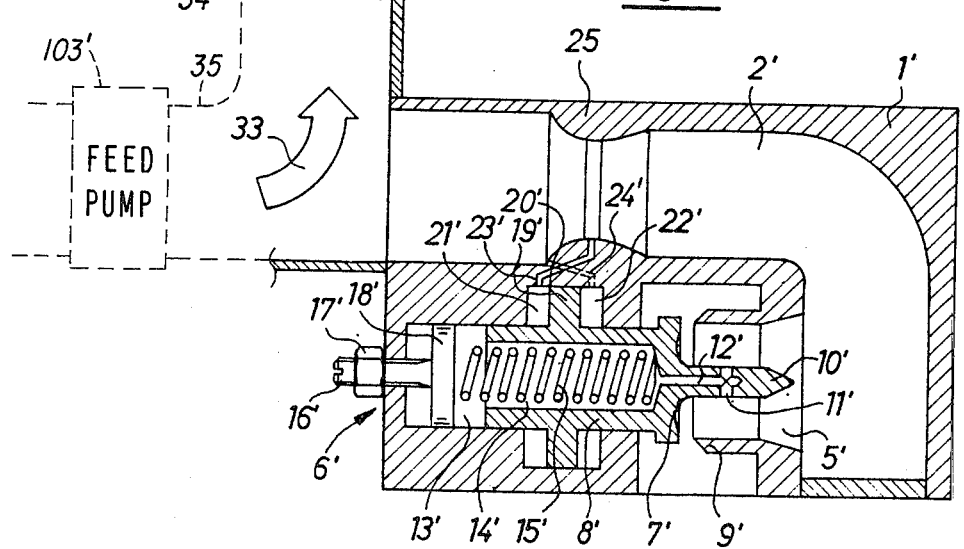

FLOW-SENSITIVE PRESSURE LIMITING VALVE FOR HYDRAULIC EQUIPMENT

This invention relates to a pressure limit valve for limiting the pressure in a hydraulic system, particularly for limiting the feed pressure line of a hydraulic unit, for example a hydraulic pump. The invention relates to valves arranged to open a passage into a relief line when the spring loading of a valve disk is overcome by the pressure in the hydraulic system, the valve disk having a guide piston with a rear pressure chamber that is connected with the face of the valve disk by means of a bore through the disk.

There is a trend towards faster operation of hydraulic pumps and motors. Whereas in the past, hydraulic pumps, particularly in the case of compression pumps, were used which have direct suction on the suction side of the pump, today hydraulic pumps are provided with an input pressure of a few atmospheres on the suction side by means of a feed pump. In hydraulic drives a feed pump can be relatively easily built in, because it is designed not for the maximum throughput, but rather for a partal throughput of the hydraulic pump that it feeds, since a portion of the low-pressure oil coming out of the hydraulic motor is led back directly to the suction side of the hydraulic pump.

There are more difficult problems to be solved if a hydraulic pump must be provided with a feed pump designed for the maximum throughput of the hydraulic pump. It is known to reduce the connecting ducts between the feed pump and the hydraulic pump by placing the feed pump directly on the control base of the hydraulic pump and to drive it by the drive shaft of the hydraulic pump.

If a hydraulic pump delivers its maximum throughput at a sufficiently high pressure, for example 150 atm., the power consumption of the feed pump relative to that of the hydraulic pump is only a few percent. When the hydraulic pump is delivering only a part of its maximum throughput at a low operating pressure of the hydraulic pump, the conditions can be quite unfavorable, because then the power consumption of the feed pump can be relatively large in comparison with that of the hydraulic pump. It is known (U.S. Pat. No. 3,626,975) to overcome this disadvantage by providing a pressure limiting valve connected to the high-pressure side of the feed pump, which valve has a drooping valving pressure characteristic with increasing flow through the valve. For this purpose a pressure limiting valve can be used of which the spring loaded valve disk is provided with a guide piston having a pressure chamber at its back that is connected, by a duct passing through the valve disk, with the front of the valve disk. If this bore is provided in such form that at this place only the static pressure is effective, then upon increase of the amount of valved flow, the pressure at the rear of the guide piston falls because of the falling static pressure, in consequence of which the force effective on the valve disk is reduced and the desired effect is obtained. If the hydraulic pump is not operated at approximately constant speed, it is further desired to reduce the feed pressure at lower speed, in order to reduce as far as possible the waste power consumption of the feed pump.

It is an object of the invention to provide a pressure limiting valve of the type above described in which the valving pressure will be suited to the various operating conditions of the system, and in particular, in which the valving pressure will be reduced with reduced pump delivery and with reduced transmission performance.

SUBJECT MATTER OF THE PRESENT INVENTION

Briefly, the guide piston of the valve plate or valve disk is arranged in operative connection with a pressure piston that divides a cylinder cavity into two chambers that are subjected to the pressure found at different places in the hydraulic system. In particular, the chambers are connected by ducts to different zones of a constriction through which the hydraulic medium flows, so that a pressure difference is produced that depends on the amount of flow. The constriction is preferably in the form of a venturi nozzle and the output of a feed pump feeding a main hydraulic pump may be caused to flow through it. When the hydraulic pump is a regulating pump, however, the invention may be used in a way in which only the flow to the valve will flow through the constriction.

The invention is further described by way of example with reference to the annexed drawing, in which FIG. 1 is a diagrammatic cross-section of a housing containing a pressure limiting valve in accordance with the invention, and FIG. 2 is a diagrammatic cross-section of a modified form of a pressure limiting valve according to the invention for use when the hydraulic pump, the input pressure of which is being limited, is a regulating pump.

As shown in FIG. 1, a conduit 2 is provided in a housing 1, the conduit 2 being for example a portion of the line, operating under pressure, through which the output of a feed pump 103 is supplied under pressure to the low-pressure side of a main hydraulic pump 104. The hydraulic fluid, normally oil, supplied by the feed pump is indicated on the drawing by an arrow 3, while the stream of fluid issuing out of the conduit 2 is indicated in FIG. 1 with an arrow 4. A branch 5 leading to the pressure limiting valve 6 is provided on one side of the cnduit 2. The moving part of the pressure limiting valve 6 comprises a valve plate 7, usually in the shape of a valve disk, on the front end of a guide piston 8, so arranged that when the pressure limiting valve is closed, the valve plate 7 lies snugly against a valve seat 9.

The valve plate 7 has a probe 10 extending towards the conduit 2 in the shaft of which a bore 11 is provided, which connects through a passage 12 to a pressure chamber 13 on the back side of the guide piston 8. The spring 15 that urges the valve plate 7 into its closed position is mounted in a rear cavity 14 of the guide piston 8 and its bias force is adjustable by means of a threaded stud 16 affixed to a spring stop 18 and equipped with a locking nut 17. The guide piston 8 forms the piston rod for a pressure piston 19 that subdivides the cylinder space 20, also provided in the housing 1, into two chambers 21 and 22. The chambers 21 and 22 are connected with the conduit 2 through passage ducts 23 and 24.

In order that the different pressures can be produced in the chambers 21 and 22, the conduit 2 is constricted at the place where the passages 23 and 24 open out into the conduit 2, this constriction 25 having a throttling or nozzle function.

Thus, for example, if the duct 23 is arranged to open into the unconstricted portion of the conduit 2 while the duct 24 opens into the most constricted cross-section of the conduit 2, then, whenever there is a flow of hydraulic medium in the conduit 2, a force is produced in the cylinder 20 by which the pressure piston 19 and, hence, the guide piston 8 are pressed towards the valve seat 9.

The constriction 25 is preferably provided in nozzle form, since a larger pressure recovery and a smaller residual pressure loss are obtained in that way. In principle, however, the other constriction arrangements are suitable for exerting a force on the piston 19, for example diaphragms, as well as the many other forms that venruri nozzles may have.

If for example there is provided at the side of the apparatus where the arrow 3 appears a feed pump 103 that is designed for the maximum throughput of a hydraulic pump 104, the latter being connected to the conduit 2 with its suction side where the arrow 4 appears, the pressure limiting valve then opens at a pressure that is determined on the one hand by the force of the spring 15 and on the other hand by the force applied to the piston 19. If the speed (r.p.m.) of the hydraulic pump falls, the speed of the feed pump driven in common likewise falls, so that a smaller amount of flow passes through the conduit 2, as a result of which the force exerted on the piston 19 is reduced and the valving pressure or threshold pressure of the pressure limiting valve is smaller than in the case of a higher speed of pump operation.

The bore 11 provided in the nose 10 of the valve plate 7 has the effect that with increasing amount of valving (that is, flow through the valve) the pressure in the pressure chamber 13 on the rear side of the guide piston 8 becomes smaller, whereby a further reduction of the closing force of the pressure limiting valve 6 is produced and in consequence there is a reduction of the feed pressure in the conduit 2.

If, however, the hydraulic pump is a regulating pump, the modified form of pressure limiting valve arrangement shown in FIG. 2 may be used. In this case, the suction side intake pipe 34 of the hydraulic pump 104 is connected to the output conduit 35 of the feed pump 103 ahead of the connection of the feed pump output to the conduit 2'. The normal flow of the output of the feed pump is indicated in this case by the arrow 33, the feed pump and the hydraulic pump that it feeds again being shown in dashed lines in the figure to indicate that they are shown only symbolicaly. The end of the conduit 2' that corresponds to the end of the conduit 2 of FIG. 1 where the arrow 4 was provided is, in this case, closed off. There flows through the conduit 2' and through the pressure limiting valve 6 only the excess output of the feed pump that is not usable by the hydraulic pump. The smaller the output of the hydraulic pump is, the greater is the amount of the output of the feed pump that is valved off by the pressure limiting valve 6. Since in this case it is desired, and also possible in view of the correspondingly smaller flow velocities in the passages of the hydraulic pump, to reduce the feed pressure, the bore 24' connects the chamber 21' to the unconstricted portion, and the bore 23' connects the chamber 22 to the most constricted portion of the conduit 2', so that when there is a flow through the conduit 2', a pressure is produced on the piston 19 providing a relieving force on the pressure limiting valve 6. so that when there is a flow through the conduit 2', a pressure What is significant for both FIG. 1 and FIG. 2 is that it is possible to modify the pressure at which relief valving takes place in response to the amount of flow of the pressure medium and to do this independently of the previously known modification of the relief valving pressure produced by a bore through the valve plate leading to a counter-pressure chamber and, furthermore, that this is accomplished in a basically simple fashion, particularly when the pressure piston 19 is provided directly on the guide piston 8. In both cases illustrated, this effect is useful to control the feed pressure provided by a feed pump to the intake side of a hydraulic pump according to operating conditions in a relatively simple fashion.

Although the invention has been described with reference to particular illustrative examples, it will be understood that modifications may be made within the inventive concept. Thus for example, the modified form of pressure limiting valve shown in FIG. 2 need not be so similar in configuration to FIG. 1 as illustrated, this similarity having been exaggerated for simplicity of explanation. As another example, the constriction 25 of the duct 2 in FIG. 1 could be situated downstream of the valve seat 9 instead of upstream as shown, in order that the effect of the flow through the valve 6 would not, through the piston 19, counteract in part the effect of the bore 11 and the chamber 13.

We claim:

1. Pressure limiting valve for limiting the pressure in a hydraulic system by reference to the force of a spring and also to a flow-induced pressure difference in the hydraulic system, comprising:

a valve seat (9) and a spring-pressed valve plate (7) arranged to block a passage between a part of a hydraulic system in which the pressure is to be limited and a relief line except when the spring is compressed by effect of hydraulic pressure;

A guide piston (8) attached to said valve plate and mounted in a housing providing a chamber (13) at the end of said guide piston remote from said valve plate, a bore being provided through said valve plate for connecting said chamber with said part of said hydraulic system;

a pressure piston (19) in force-transmitting relation to said guide piston (8) arranged in a cylinder cavity (20) so as to divide it into two chambers (21,22), and duct means for connecting the respective chambers of said cylinder cavity to two different zones of a constriction in said hydraulic system which are at different pressure when there is substantial hydraulic flow through such constriction, whereby the amount of said flow is caused to shift the pressure limiting threshold of the valve.

2. Pressure limiting valve as defined in claim 1, in which said pressure piston is provided on the periphery of said guide piston, so that said guide piston forms the piston rod for said pressure piston, and in which said cylinder cavity is within said housing.

3. Pressure limiting valve as defined in claim 3, in which said constriction is a venturi nozzle contained in said housing between the portion of said hydraulic system upstream of said valve seat and another portion of said hydraulic system downstream of said valve seat, and in which, further, the connection of said duct means (23,24) to said chambers (20,21) is so arranged as that the limit pressure provided by the valve is reduced when the flow through said constriction increases.

4. Pressure limiting valve as defined in claim 2, in which said constriction is a venturi nozzle between said hydraulic system and a chamber closed by said valve plate and valve seat, whereby the pressure difference affecting said pressure piston is a pressure difference produced by the flow through said valve seat when the valve is open, the duct means being so connected to the venturi nozzle as to decrease the pressure limit threshold with increasing flow.

* * * * *